US008849205B2

(12) United States Patent
Desai et al.

(10) Patent No.: US 8,849,205 B2
(45) Date of Patent: Sep. 30, 2014

(54) METHOD AND SYSTEM FOR MULTI-STAGE DEVICE FILTERING IN A BLUETOOTH LOW ENERGY DEVICE

(71) Applicant: Broadcom Corporation, Irvine, CA (US)

(72) Inventors: Prasanna Desai, Elfin Forest, CA (US); Angel Polo, San Diego, CA (US); Chikan Kwan, San Diego, CA (US); Yuan Zhuang, San Diego, CA (US); Ash Kapur, Frederick, MD (US); Norbert Grunert, Sophia Antipolis (FR); Brima Ibrahim, Aliso Viejo, CA (US); John Walley, Ladera Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/036,155

(22) Filed: Sep. 25, 2013

(65) Prior Publication Data
US 2014/0057567 A1 Feb. 27, 2014

Related U.S. Application Data

(63) Continuation of application No. 12/839,957, filed on Jul. 20, 2010, now Pat. No. 8,554,141.

(60) Provisional application No. 61/358,352, filed on Jun. 24, 2010.

(51) Int. Cl.
| | |
|---|---|
| *H04B 7/00* | (2006.01) |
| *H04W 4/00* | (2009.01) |
| *H04L 29/06* | (2006.01) |
| *H04W 8/00* | (2009.01) |
| *H04W 84/18* | (2009.01) |
| *H04W 28/04* | (2009.01) |
| *H04L 1/00* | (2006.01) |
| *H04W 28/06* | (2009.01) |

(52) U.S. Cl.
CPC ............. *H04W 8/005* (2013.01); *H04W 4/008* (2013.01); *H04L 63/02* (2013.01); *H04W 84/18* (2013.01); *H04W 28/04* (2013.01); *H04L 1/0061* (2013.01); *H04W 28/06* (2013.01)
USPC ..... 455/41.2; 455/41.1; 455/414.1; 705/14.1; 705/27.1

(58) Field of Classification Search
USPC ................. 455/41.1–41.3, 414.1–414.4, 450; 705/14.1, 27.1
See application file for complete search history.

(56) References Cited

U.S. PATENT DOCUMENTS

| | | | |
|---|---|---|---|
| 7,174,447 | B2 | 2/2007 | Zimmer et al. |
| 7,613,484 | B2 | 11/2009 | Lappetelainen et al. |

(Continued)

FOREIGN PATENT DOCUMENTS

| | | |
|---|---|---|
| CN | 101150535 A | 3/2008 |
| CN | 101646221 A | 2/2010 |
| WO | 2009152628 | 12/2009 |

*Primary Examiner* — Tuan H Nguyen
(74) *Attorney, Agent, or Firm* — McDermott Will & Emery LLP

(57) ABSTRACT

A Bluetooth low energy (BLE) device receives advertising packets from an advertising BLE device. The BLE device filters the received advertising packets utilizing hardware to search for the advertiser. If the advertiser is not found by the hardware, the packet filtering continues utilizing firmware. Device identity information, comprising non-private and/or private device identities, of preferred BLE devices is partitioned to form a different white list for the hardware, firmware, and host, respectively, to concurrently support privacy and white listing. If the advertiser is found by the hardware, the hardware sends a response to the advertiser following a successful CRC check performed in the hardware. If the advertiser is found by the firmware, the device identity information of the advertiser is inserted in the white list for the hardware. The host may be awakened based on the device configuration and/or attribute type information of the received advertising packets.

20 Claims, 5 Drawing Sheets

(56) References Cited

U.S. PATENT DOCUMENTS

| | | |
|---|---|---|
| 7,835,943 B2 | 11/2010 | Cheung et al. |
| 8,554,141 B2 | 10/2013 | Desai et al. |
| 2003/0074458 A1 | 4/2003 | Gokhale |
| 2004/0077383 A1 | 4/2004 | Lappetelainen et al. |
| 2005/0182950 A1 | 8/2005 | Son et al. |
| 2006/0154691 A1 | 7/2006 | Tang et al. |
| 2008/0109302 A1 | 5/2008 | Salokannel et al. |
| 2008/0288845 A1 | 11/2008 | Tsfati et al. |

METHOD AND SYSTEM FOR MULTI-STAGE DEVICE FILTERING IN A BLUETOOTH LOW ENERGY DEVICE

CROSS-REFERENCE TO RELATED APPLICATIONS/INCORPORATION BY REFERENCE

This patent application is a continuation of U.S. patent application Ser. No. 12/839,957, filed Jul. 20, 2010, which makes reference to, claims priority to and claims the benefit from U.S. Provisional Patent Application Ser. No. 61/358,352 filed on Jun. 24, 2010.

This application makes reference to U.S. application Ser. No. 12/546,621 filed on Aug. 24, 2009.

The above stated application is hereby incorporated herein by reference in its entirety.

FIELD OF THE INVENTION

Certain embodiments of the invention relate to communication systems. More specifically, certain embodiments of the invention relate to a method and system for multi-stage device filtering in a Bluetooth low energy device.

BACKGROUND OF THE INVENTION

The Bluetooth low energy (BLE) is a specification that enables radio frequency communication operating within the globally accepted 2.4 GHz Industrial, Scientific & Medical (ISM) band. The BLE specification supports a physical layer bit rate of 1 Mbit/s over a range of 5 to 15 meters. The BLE wireless technology specification features two implementations, namely "dual-mode" and "single-mode". In the dual-mode implementation, BLE functionality is an add-on feature within traditional Bluetooth, namely, Bluetooth Basic Rate (BR) and Bluetooth Enhanced Data Rate (EDR), sharing a great deal of existing functionality resulting in a minimal cost increase compared to existing Bluetooth BR/EDR enabled devices. The dual-mode implementation is targeted at mobile devices and personal computers. The single-mode implementation is power and cost optimized. The single-mode implementation features a lightweight Link Layer (LL) providing ultra-low power idle mode operation, simple device discovery and reliable point-to-multipoint data transfer with advanced power-save and encryption functionalities. The single-mode implementation is targeted at, for example, small, button-ell battery powered devices in, for example, sports and wellness, healthcare, entertainment and toys and mobile accessories product categories. The BLE offers connectivity between mobile devices or personal computers, and small button-cell battery power devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for multi-stage device filtering in a Bluetooth low energy device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for multi-stage device filtering in a Bluetooth low energy device. In various embodiments of the invention, a Bluetooth low energy (BLE) device such as a scanner and/or an initiator may receive advertising packets transmitted from an advertising BLE device (advertiser). The BLE device may be configured to filter the received advertising packets utilizing the hardware of the BLE device to search for advertisers of interest prior to packet processing. In instances where the advertiser is not found by the hardware device filtering, the BLE device may continue filtering the received advertising packets utilizing the firmware of the BLE device. Device identity information of preferred BLE devices may be partitioned to form a white list for the hardware, a white list for the firmware and a white list for the host for corresponding device filtering. The device identity information may comprise non-private device identity such as 48-bit Bluetooth low energy device addresses, and/or private device identity information such as Resolvable Private Addresses (RPAs) and/or Identity Root Key (IRK) for concurrent support of privacy and white listing. White listing is a method of blocking access from those devices not on white lists. The BLE device may start searching for advertisers of interest utilizing the hardware for device filtering so as to achieve a fast response time to an advertiser of interest. In instances where the advertiser is found by the hardware device filtering, the BLE device may perform a CRC check utilizing the hardware on the received advertising packets. A response may be sent by the hardware to the advertiser if the CRC check passes. In instances where the advertiser is found by the firmware device filtering, the device identity information of the advertiser may be inserted in the hardware white list for subsequent advertising packets from the advertiser. In instances where the advertiser is not found utilizing the firmware device filtering, the firmware may be operable to awaken the host to continue device filtering in the host depending on the device configuration. For example, the firmware may be operable to awaken the host based on attribute type information of the received advertising packets to process the received advertising packets for a service.

Figure 1:
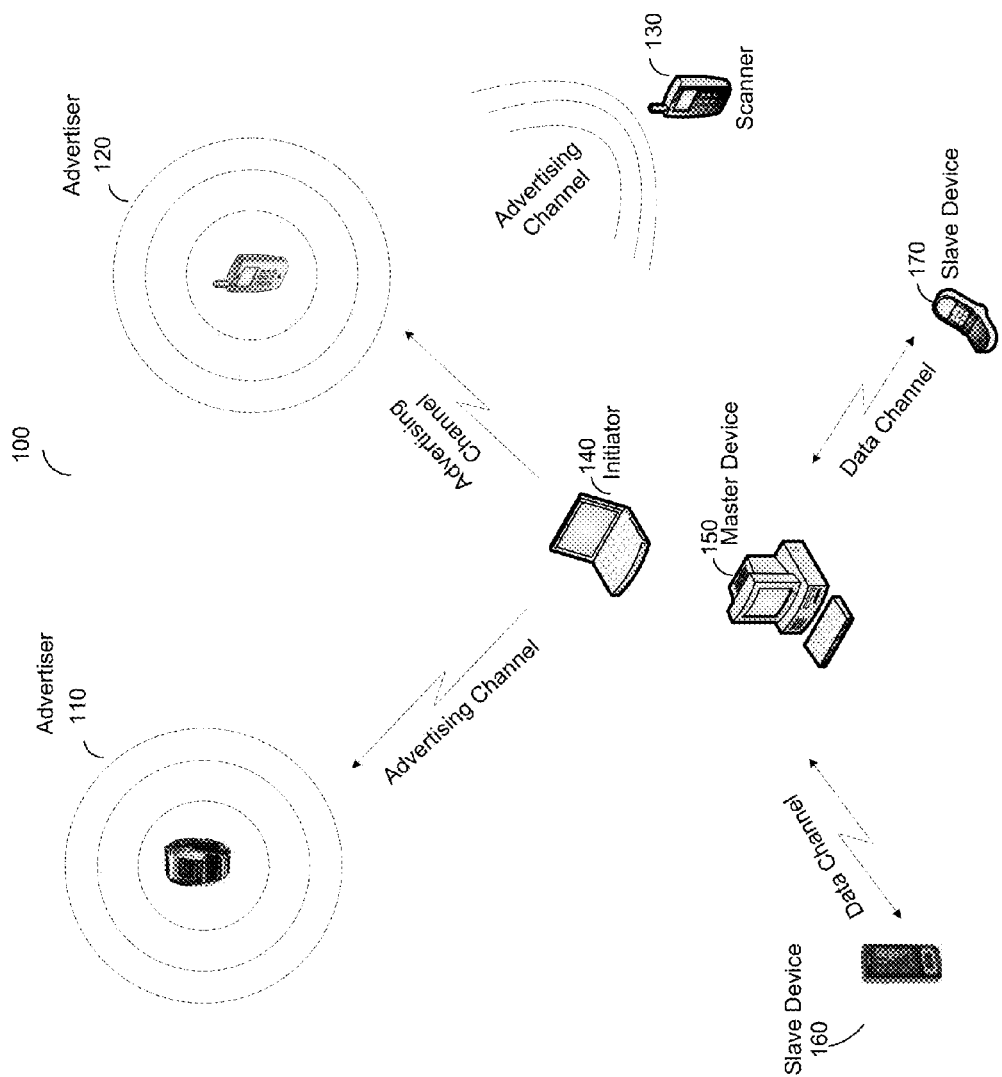
FIG. 1 is a diagram illustrating an exemplary Bluetooth Low Energy (BLE) communication system that is operable to support multi-stage device filtering in a Bluetooth low energy device, in accordance with an embodiment of the invention.

FIG. 1 is a diagram illustrating an exemplary Bluetooth Low Energy (BLE) communication system that is operable to support multi-stage device filtering in a Bluetooth low energy device, in accordance with an embodiment of the invention. Referring to FIG. 1, there is shown a Bluetooth low energy (BLE) communication system 100 comprising a plurality of BLE devices, of which advertisers 110-120, a scanner 130, an initiator 140, a master device 150, and slave devices 160-170 are displayed.

The BLE communication system 100 may be operable to utilize a frequency division multiple access (FDMA) scheme and a time division multiple access (TDMA) scheme to support vice and/or data communication. The communication system 100 may be configured to divide a plurality of physical channels, for example, 40 physical channels, into advertising channels and data channels per FDMA scheme. In advertising channels, a BLE device may function in a role as an advertiser, a scanner, or an initiator. In data channels, a BLE device may play a role as a master or a slave. The communication system 100 may be operable to utilize a TDMA based polling scheme in link layer communications between the master device 150 and the slave devices 160-170.

An advertiser such as the advertiser 120 may comprise suitable logic, circuitry, interfaces and/or code that may be operable to broadcast advertisements periodically in advertising channels. The advertiser 120 may be configured to advertise service and/or availability for a link layer connection within advertising events. An advertising event may begin with the presence of an advertising packet sent by the advertiser 120. The advertiser 120 may become a slave once a link layer connection has been set up with a peer BLE device.

The scanner 130 may comprise suitable logic, circuitry, interfaces and/or code that may be operable to search for advertising BLE devices within range for device discovery. The scanner 130 may be operable to perform a passive scan or an active scan. In a passive scan, the scanner 130 may be operable to monitor advertising packets and may not transmit messages back to advertisers. In an active scan, the scanner 130 may request an advertiser to transmit additional information that may not be available in the received advertising packets. The scanner 130 may be operable to extract, for example, access address, from the received advertising packets so as to derive a device identity for the intended advertiser. The scanner 130 may be configured to search for the derived device identity of the intended advertiser, in a white list, for device filtering. The white list may comprise device identities of preferred BLE devices. The white list may be stored in, for example, local memory, in the scanner 130. The scanner 130 may be configured to process advertising packets received from advertisers in the white list.

In an exemplary embodiment of the invention, the scanner 130 may be operable to concurrently support privacy and white listing during device discovery. In this regard, the scanner 130 may be operable to form a white list with device identities such as 48-bit Bluetooth low energy device addresses, device class bits, Resolvable Private Addresses (RPAs) and/or Identity Root Key (IRK) for device filtering. In an exemplary embodiment of the invention, the scanner 130 may be operable to maintain a separate white list for different portions of processing resources. In this regard, the scanner 130 may be operable to partition device identities of preferred BLE devices to generate or form a hardware white list, a firmware white list and a host white list, respectively, depending on corresponding processing time and/or available memory. The scanner 130 may store the hardware white list, the firmware white list and the host white list in dedicated local memory, where it may be quickly read by hardware, firmware and the host, respectively.

In an exemplary embodiment of the invention, the scanner 130 may be operable to perform multi-stage device filtering utilizing hardware, then firmware and host, based on corresponding white lists. For example, upon receiving an advertising packet, the scanner 130 may be operable to extract an access code from the received advertising packet. A device identity of an intended advertiser for the received advertising packet may be derived based on the extracted access code. The scanner 130 may determine whether the intended advertiser is on the white lists prior to processing the received advertising packet. In this regard, the scanner 130 may be operable to utilize hardware to initiate a search for the derived device identity of the intended advertiser. In instances where a match is found utilizing hardware, in the hardware white list for the intended advertiser, the scanner 130 may be operable to perform cyclic redundancy check (CRC), utilizing hardware, to check possible transmission error in the received advertising packet. A response may be transmitted to the advertiser, utilizing hardware, if the CRC check passes. In instances where no match is found, by hardware, in the hardware white list for the intended advertiser, the scanner 130 may continue the search utilizing firmware. In this regard, the scanner 130 may be operable to utilize firmware to perform a binary tree search in the firmware white list for the intended advertiser. In instances where a match is found in the firmware white list, utilizing the firmware, for the intended advertiser, the scanner 130 may be operable to insert the derived device identity of the intended advertiser in the hardware white list for a subsequent reception of advertising packets from the intended advertiser. In order to maintain the size of the hardware white list, the scanner 130 may delete one or more suitable entries in the hardware white list when needed. In instances where no match is found in the firmware white list, utilizing firmware, for the intended advertiser, the scanner 130 may be operable to awaken the host to continue the search in the host depending on device configuration.

In an exemplary embodiment of the invention, the scanner 130 may be operable to perform device filtering based on attribute type information of received advertising packets. In instances where the scanner 130 fails to identify, utilizing hardware and firmware, an intended advertiser of a received advertising packet, the scanner 130 may be operable to determine attribute type information of the received advertising packet based on corresponding payload contents stored in the hardware, for example. In instances where the received advertising packet indicates desired attribute type information such as desired locations and/or location related data, the scanner 130 may be operable to awaken the host to continue the search for the intended advertiser in the host, or to process the received advertising packet in the host for corresponding service even in instances when no match is found utilizing hardware and firmware for the intended advertiser.

The initiator 140 may comprise suitable logic, circuitry, interfaces and/or code that may be operable to request establishment of a link layer connection with an intended advertiser. The initiator 140 may be operable to monitor traffic over advertising channels. Upon receiving advertising packets of interest, the initiator 140 may be operable to determine or identify an intended advertiser from which the advertising packets of interest are received. The initiator 140 may be configured to process advertising packets from advertisers in a white list. In this regard, the initiator 140 may be operable to perform device filtering to search for the intended advertiser in a way similar to the multi-stage device filtering approach described above for the scanner 130. Once the intended advertiser is found in white lists, the initiator 140 may send a connection request (Connect_REQ) packet in an advertising channel, in which the intended advertiser such as the advertiser 120 is advertising. The Connect_REQ packet may comprise connection parameters such as hopping frequency length that may be utilized for calculating a data channel so as to set up a link layer connection with the advertiser 120.

The master device 150 may comprise suitable logic, circuitry, interfaces and/or code that may be operable to communicate with slaves such as the slave devices 160-170. The master device 150 may be operable to support multiple link layer connections at a time to various slaves, for example, the slave devices 160-170. The master device 150 may be operable to manage various aspects of data packet communication in a link layer connection with an associated slave such as the slave device 170. For example, the master device 150 may be enabled to determine operation schedule in the link layer connection with the slave device 170. The master device 150 may be operable to initiate a packet exchange sequence in the link layer connection with its own transmission. Link layer connections may comprise periodic connection events in data channels. Data packet transmissions may take place within connection events.

A slave device such as the slave device 170 may comprise suitable logic, circuitry, interfaces and/or code that may be operable to communicate with a master such as the master device 150 in an associated link layer connection. The slave device 170 may be associated with one link layer connection with the master device 150. The slave device 170 may be operable to synchronize to connection event start points, called anchor points from a slave's perspective, for data communication with the master device 150. The slave device 170 may consider that a link layer connection setup with the master device 150 may be complete after receiving a connection request (CONNECT_REQ) packet from the master device 150. The slave device 170 may be operable to calculate a data channel index using a channel selection algorithm for each connection event in the associated link layer connection. The data channel index may be determined based on, for example, a hopping frequency length (Hop_length) in the received CONNECT_REQ packet. The slave device 170 may be enabled to move to a data channel with the calculated data channel index to communicate data packets with the master device 150. The slave device 170 may be operable to transmit data packets in the data channel after receiving a packet from the master device 150 in associated link layer connection.

In an exemplary operation, an advertiser such as the advertiser 120 may be operable to transmit advertising packets in advertising channels to BLE devices such as, for example, the scanner 130 and/or the initiator 140. The scanner 130 may be operable to discover devices within range by scanning advertising packets. In an exemplary embodiment of the invention, the scanner 130 may be configured to concurrently support privacy and white listing during device discovery. In this regard, a white list utilized by the scanner 130 may comprise device identity information such as, for example, 48-bit Bluetooth low energy device addresses, device class bits, RPAs and/or IRK. In an exemplary embodiment of the invention, the scanner 130 may be configured to manage or maintain device identities of preferred BLE devices in a hardware white list, a firmware white list and a host white list, respectively, for lower device power consumption. In this regard, a multi-stage device filtering approach may be employed by the scanner 130 during device discovery. More specifically, the scanner 130 may be operable to perform device filtering utilizing hardware, then firmware and host according to the corresponding white lists.

In instances where a device identity of an intended advertiser for received advertising packets is found or identified in the hardware white list, utilizing hardware, the scanner 130 may perform a CRC check in the hardware for transmission errors in the received advertising packets. With a successful CRC check, the scanner 130 may be operable to transmit a response in hardware to the intended advertiser. The device filtering may continue utilizing firmware if no match for the intended advertiser is found utilizing hardware. In instances where a match for the intended advertiser is found utilizing firmware, the scanner 130 may insert the device identity of the intended advertiser in the hardware white list for a subsequent reception of advertising packets from the intended advertiser. In instances where no match is found for the intended advertiser utilizing firmware, the scanner 130 may be configured to awaken the host to continue device filtering in the host depending on the device configuration. In this regard, in an exemplary embodiment of the invention, the scanner 130 may be configured to determine whether to awaken the host to continue device filtering or process the received advertising packets for a corresponding service based on attribute type information associated with the received advertising packets. For example, in instances where the received advertising packets may correspond to attribute type information such as specific locations of interest, the scanner 130 may be configured to awaken the host to continue device filtering or process the received advertising packets in the host, even in instances when the intended advertiser is not found utilizing hardware and firmware.

When advertising for a link layer connection, the advertiser 120 may be operable to listen to CONNECT_REQ packets from, for example, the initiator 140. The initiator 140 may be configured to send CONNECT_REQ packets to advertisers in a white list. Similar to the scanner 130, the initiator 140 may be operable to concurrently support privacy and white listing during device filtering. The multi-stage device filtering approach may be applied by the initiator 140 to reduce power consumption. Upon receiving a CONNECT_REQ packet addressed to the advertiser 120 from the initiator 140, the advertiser 120 may move to a data channel and operate as a slave. Upon being acknowledged by the master device 150, the slave device 170 may be operable to communicate BLE packet transmissions using connection parameters assigned by the master device 150.

Figure 2:
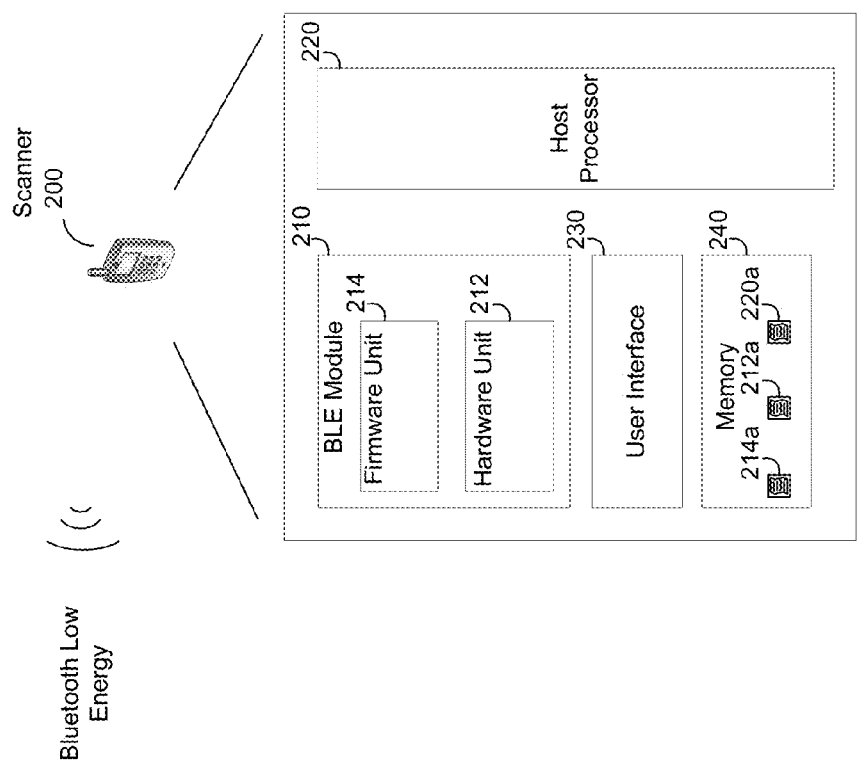
FIG. 2 is a block diagram illustrating an exemplary Bluetooth Low Energy (BLE) device that is operable to perform multi-stage device filtering during device discovery, in accordance with an embodiment of the invention.

FIG. 2 is a block diagram illustrating an exemplary Bluetooth Low Energy (BLE) device that is operable to perform multi-stage device filtering during device discovery, in accordance with an embodiment of the invention. Referring to FIG. 2, there is shown a scanner 200 comprising a BLE module 210, a host processor 220, a user interface 230, and a memory 240. The BLE module 210 comprises a hardware unit 212 and a firmware unit 214.

The BLE module 210 may comprise suitable logic, circuitry, interfaces and/or code that may be operable to transmit and/or receive signals over Bluetooth low energy air interface. The received signals may comprise advertising packets received over advertising packets.

The BLE module 210 may be configured to maintain a hardware white list 212a and a firmware white list 214a, respectively, for device filtering on the received advertising packets. The hardware unit 212 may comprise suitable logic, circuitry, interfaces and/or code that may be operable to provide support of BLE baseband functionality and BLE radio. The firmware unit 214 may comprise suitable logic, circuitry, interfaces and/or code that may be operable to provide support of link management functionality for the BLE device. The BLE module 210 may be operable to process received advertising packets of preferred advertisers in the white list 212a and/or the white list 214a.

The BLE module 210 may be operable to utilize hardware and/or firmware to concurrently support privacy and white listing during device discovery. The hardware white list 212a and the firmware white list 214a may comprise various device identities such as 48-bit Bluetooth low energy device addresses, device class bits, RPAs and/or IRK for device filtering.

In an exemplary embodiment of the invention, the BLE module 210 may be operable to perform device filtering in the hardware unit 212, then in the firmware unit 214 if no match is found utilizing the hardware unit 212. For example, upon receiving an advertising packet, the BLE module 210 may start a search, in the hardware unit 212, for an intended advertiser for the received advertising packet utilizing the hardware white list 212a. In instances where a match for the intended advertiser is found in the hardware white list 212a, the BLE module 210 may perform a CRC check within the hardware unit 212a for possible transmission errors in the received advertising packet. The BLE module 210 may be operable to transmit a response utilizing the hardware unit 212 to the intended advertiser if the CRC check passes. In instances where no match for the intended advertiser is found in the hardware white list 212a, the BLE module 210 may continue the search utilizing the firmware unit 214. In this regard, a binary tree search may be performed in the firmware unit 214 for the intended advertiser. In instances where a match for the intended advertiser is found in the firmware white list 214a, the BLE module 210 may be operable to insert a device identity of the intended advertiser in the hardware white list 212a for a subsequent reception of advertising packets from the intended advertiser.

The BLE module 210 may also be operable to delete one or more entries in the hardware white list 212a as needed. In instances where no match for the intended advertiser is found in the firmware white list 214a, the firmware unit 214 may be operable to awaken the host processor 220 to continue the search in host depending on device configuration. For example, in instances where no match for the intended advertiser is found in the hardware white list 212a and the firmware white list 214a, the firmware unit 214 may be configured to evaluate attribute type information related to the received advertising packet based on corresponding payload contents stored in the hardware unit 212, for example. In instances where the received advertising packet indicates attribute type information such as desired locations and/or location related data, the firmware unit 214 may be operable to awaken the host processor 220 to continue the search for the intended advertiser in the host, or to process the received advertising packets in the host even when no match is found for the intended advertiser utilizing the hardware unit 212 and the firmware unit 214.

The host processor 220 may comprise suitable logic, circuitry, interfaces and/or code that may be operable to manage and/or control operations of device components such as the BLE module 210 and the user interface 230. The host processor 220 may be operable to perform a variety of signal processing tasks associated with the BLE module 210.

In an exemplary embodiment of the invention, the host processor 220 may be operable to partition device identities of preferred BLE devices to form the hardware white list 212a, the firmware white list 214a and the host white list 220a, respectively, based on corresponding tolerable processing time and/or available memory. The host processor 220 may be operable to store the hardware white list 212a, the firmware white list 214a and the host white list 220a in the memory 240 to be read by the hardware unit 212, the firmware unit 214, and the host processor 220, respectively, for corresponding device filtering.

In an exemplary embodiment of the invention, the host processor 220 may be awakened by the firmware unit 214 in the BLE module 210 to perform device filtering utilizing the white list 220a and/or process the received advertising packets for corresponding service.

The user interface 230 may comprise suitable logic, circuitry, interfaces and/or code that may be operable to service the scanner 200 via entering user inputs and/or presenting various services to users.

The memory 240 may comprise suitable logic, circuitry, interfaces and/or code that may enable storage of data and/or other information utilized by the host processor 220. For example, the host memory 240 may be utilized to store data communicated via the BLE module 210. The host memory 240 may store the hardware white list 212a, the firmware white list 214a and the host white list 220a for device filtering utilizing the hardware, firmware and host, respectively. The hardware white list 212a, the firmware white list 214a and the host white list 220a may comprise various device identities such as 48-bit Bluetooth low energy device addresses, device class bits, RPAs and/or IRK for concurrent support of privacy and white listing in host. The memory 240 may comprise RAM, ROM, low latency nonvolatile memory such as flash memory and/or other suitable electronic data storage capable of storing data and instructions.

In an exemplary operation, the scanner 200 may be operable to discover devices within range by scanning advertising packets in advertising channels. In order to reduce power consumption, the scanner 200 may be configured to perform device filtering at multiple processing stages, namely, utilizing the hardware unit 212, the firmware unit 214 and the host processor 220, respectively. The host processor 220 may be operable to partition device identities of preferred BLE devices to form the hardware white list 212a, the firmware white list 214a and the host white list 220a, respectively, for device filtering at corresponding processing stages. Each white list may comprise device identities such as 48-bit Bluetooth low energy device addresses, device class bits, RPAs and/or IRK for concurrent support of privacy and white listing at corresponding processing stage during device filtering.

The scanner 200 may be operable to initiate device filtering in the hardware unit 212 utilizing the hardware white list 212a. In instances where an intended advertiser for a received advertising packet is found or identified in the hardware white list 212a, the hardware unit 212 may be operable to perform a CRC check for transmission errors in the received advertising packet. With a successful CRC check, the hardware unit 212 may be operable to transmit a response to the intended advertiser. The scanner 200 may continue the device filtering in the firmware unit 214 if no match for the intended advertiser is found in the hardware unit 212. In instances where a match for the intended advertiser is found in the firmware unit 214, the firmware unit 214 may be operable to insert the device identity of the intended advertiser in the hardware white list 212a for a subsequent reception of advertising packets from the intended advertiser. In instances where no match is found for the intended advertiser in the firmware unit 214, the firmware unit 214 may be configured to awaken host processor 220 to continue device filtering in the host depending on device configuration. In this regard, the firmware unit 214 may be configured to determine whether to awaken the host processor 220 to continue device filtering in the host based on attribute type information associated with the received advertising packets. For example, in instances where the received advertising packets may indicate attribute type information such as desired locations or an expected service, the firmware unit 214 may be configured to awaken the host processor 220 to continue device filtering or process the received advertising packets in the host, even when the intended advertiser is not found utilizing the hardware unit 212 and the firmware unit 214. A service corresponding to the received advertising packets may be presented to users via the user interface 230.

Figure 3:
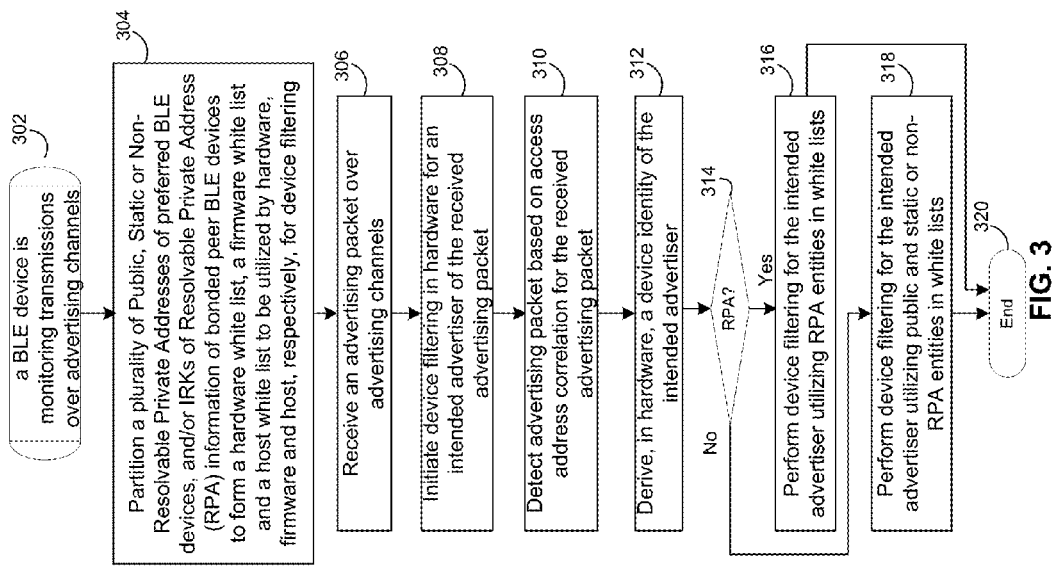
FIG. 3 is a block diagram illustrating exemplary steps that may be performed by a Bluetooth Low Energy (BLE) device to concurrently support Resolvable Private Address (RPA) resolution and white listing during device discovery, in accordance with an embodiment of the invention.

FIG. 3 is a block diagram illustrating exemplary steps that may be performed by a Bluetooth Low Energy (BLE) device to concurrently perform Resolvable Private Address (RPA) resolution and white listing during device discovery, in accordance with an embodiment of the invention. Referring to FIG. 3, the exemplary steps may start with step 302. In step 302, a BLE device such as the scanner 200 may be operable to monitor transmissions over advertising channels. In step 304, the scanner 200 may be operable to partition a plurality of non-Resolvable Private Address (RPA) information such as Public, Static and/or Non-Private Addresses of preferred BLE devices, and/or RPA information such as IRKs of bonded peer BLE devices to form the hardware white list 212a, the firmware white list 214a and the host white list 220a to be utilized by the hardware unit 212, the firmware unit 214 and the host processor 220, respectively, for device filtering. In step 306, the scanner 200 may be operable to receive an advertising packet over advertising channels. In step 308, the scanner 200 may be operable to initiate device filtering utilizing hardware such as the hardware unit 212 for an intended advertiser of the received advertising packet. In step 310, the hardware unit 212 may be operable to detect advertising packet based on access address correlation for the received advertising packet. In step 312, the hardware unit 212 may be operable to derive a device identity for the intended advertiser from the extracted access address. In step 314, the hardware unit 212 may determine whether the derived device identify for the intended advertiser is a RPA. In instances where the derived device identity for the intended advertiser is a RPA, then control passes to step 316. In step 316, the hardware unit 212 may be operable to perform device filtering by comparing the derived device identity with RPA related entities in the white list 212a. The exemplary steps may end in step 320.

In step 314, in instances where the derived device identity for the intended advertiser is a non-RPA, then control passes to step 318. In step 318, the hardware unit 212 may be operable to perform device filtering by comparing the derived device identity with public, static or non-RPA entities in the white list 212a. The exemplary steps may end in step 320.

Figure 4:
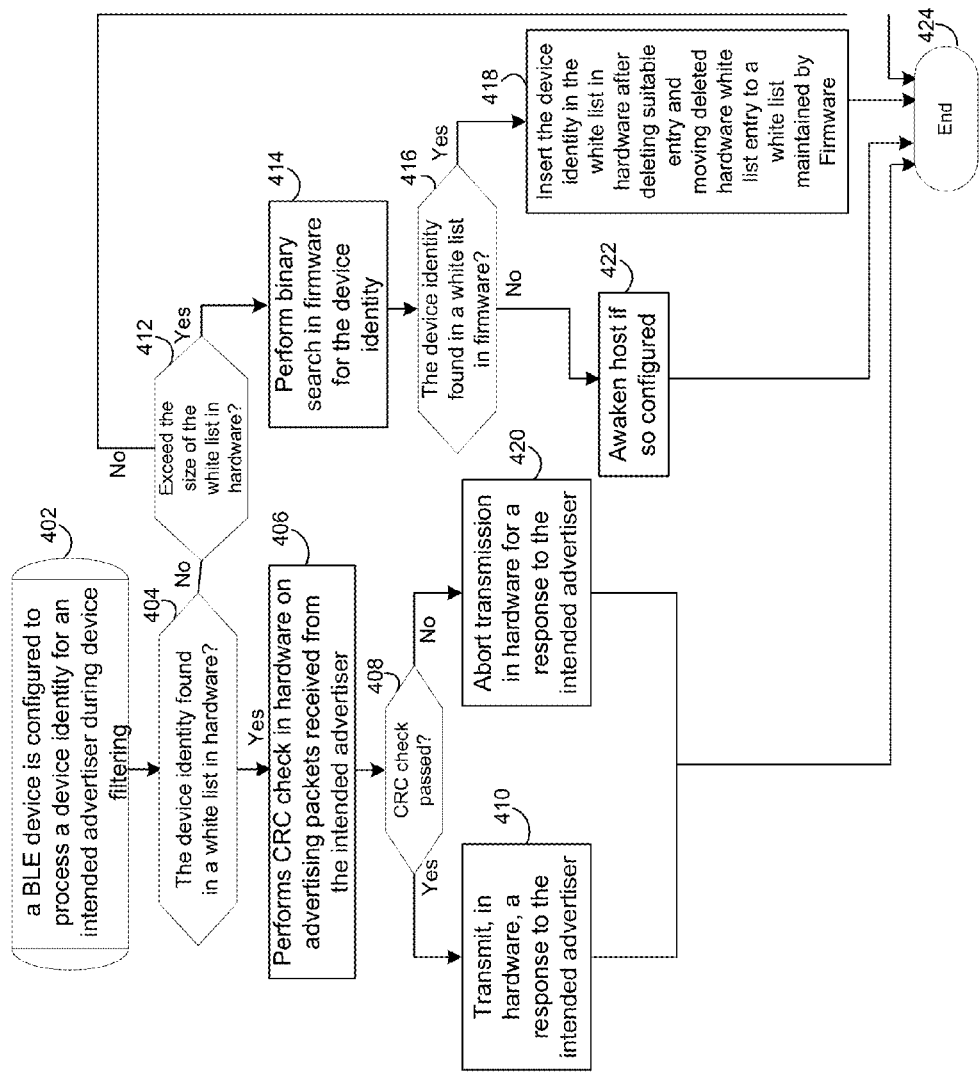
FIG. 4 is a block diagram illustrating exemplary steps that may be performed by a Bluetooth Low Energy (BLE) device for fast white list search during device discovery, in accordance with an embodiment of the invention.

FIG. 4 is a block diagram illustrating exemplary steps that may be performed by a Bluetooth Low Energy (BLE) device for fast white list search during device discovery, in accordance with an embodiment of the invention. Referring to FIG. 4, the exemplary steps may start with step 402. In step 402, a BLE device such as the scanner 200 may be configured to process a device identity for an intended advertiser during device filtering. In step 404, the scanner 200 may determine whether the device identity is found, utilizing hardware such as the hardware unit 212, in the hardware white list 212a. In instances where the device identity is found in the hardware white list 212a utilizing the hardware unit 212, then control passes to step 406. In step 406, the hardware unit 212 may be operable to perform a CRC check for transmission errors in advertising packets received from the intended advertiser. In step 408, the hardware unit 212 may determine whether the CRC test passes. In instances where the CRC test passes, then control passes to step 410. In step 420, the hardware unit 212 may be operable to transmit a response to the intended advertiser for the received advertising packets. The exemplary steps may end in step 424.

In step 404, in instances where the device identity is not found in the hardware white list 212a utilizing the hardware unit 212, then control passes to step 412. In step 412, it may be determined if the size of the hardware white list 212a may exceed a predetermined limit. In instances where the size of the hardware white list 212a exceeds a predetermined limit, the control passes to step 414. In step 414, the firmware unit 214 may be configured to perform a binary tree search in the firmware white list 214a for the intended advertiser. In step 416, the firmware unit 214 may determine whether the device identity of the intended advertiser is found, in the firmware white list 214a. In instances where the device identity of the intended advertiser is found in the firmware white list 214a, then control passes to step 418. In step 418, the firmware unit 214 may be operable to insert the device identity in the hardware white list 212a after deleting one or more entries whenever it is necessary to do so. The deleted hardware white list entries may be moved to the firmware white list 214a maintained by the firmware unit 214. The exemplary steps may end in step 424.

In step 408, in instances where the CRC test fails within the hardware unit 212, then control passes to step 420. In step 420, the hardware unit 212 may be operable to abort transmission for a response to the intended advertiser. The exemplary steps may end in step 424.

In step 412, in instances where the size of the white list 212a does not exceed a predetermined limit, then the exemplary steps may end in step 424.

In step 416, in instances where the device identity of the intended advertiser is not found, utilizing the firmware unit 214, in the firmware white list 214a, then control passes to step 422. In step 422, the firmware unit 214 may be operable to awaken the host processor 220 for device filtering in the host depending on device configuration. The exemplary steps may end in step 424.

Figure 5:
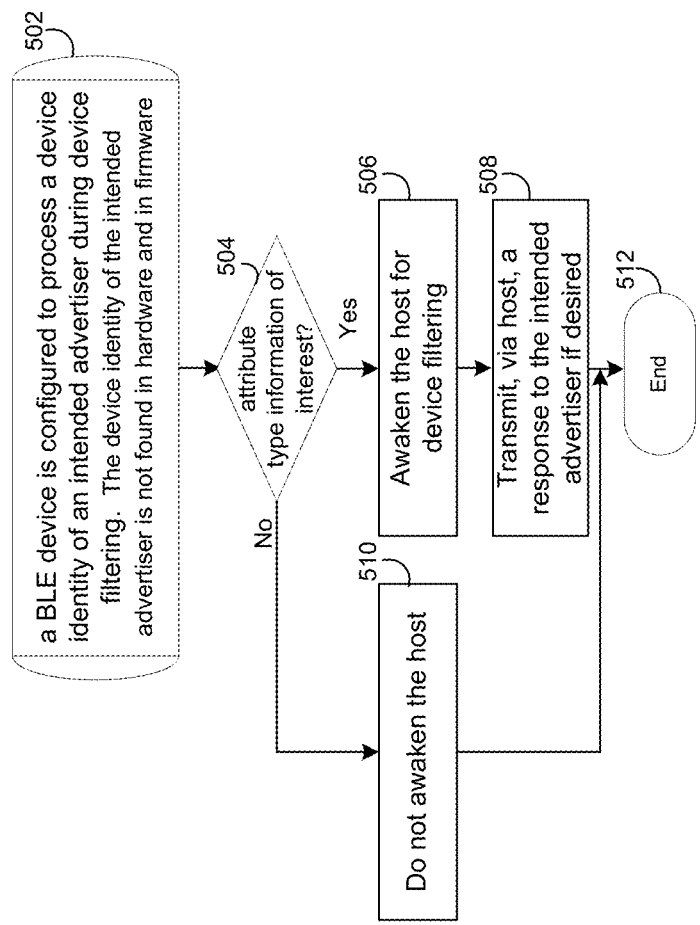
FIG. 5 is a block diagram illustrating exemplary steps that may be performed by a Bluetooth Low Energy (BLE) device for attribute type based device filtering during device discovery, in accordance with an embodiment of the invention.

FIG. 5 is a block diagram illustrating exemplary steps that may be performed by a Bluetooth Low Energy (BLE) device for attribute type based device filtering during device discovery, in accordance with an embodiment of the invention. Referring to FIG. 5, the exemplary steps may start with step 502. In step 502, a BLE device such as the scanner 200 is configured to process a device identity of an intended advertiser during device filtering. The device identity of the intended advertiser is not found utilizing hardware and firmware. In step 504, it may be determined whether advertising packets received from the intended advertiser indicate attribute type information of interest. In instances where the received advertising packets from the intended advertiser related to attribute type information of interest, then control pass to step 506. In step 506, the firmware unit 214 may be operable to awaken the host processor 220 to continue device filtering or process the received advertising packets in the host, even the intended advertiser is not found utilizing hardware and firmware. In step 508, the host processor 220 may be operable to transmit a response to the intended advertiser if desired. The exemplary steps may end in step 512.

In step 504, in instances where the received advertising packets from the intended advertiser do not relate to attribute type information of interest, then control pass to step 510. In step 510, the firmware unit 214 may be configured so that it does not awaken the host processor 220. In other words, the device filtering may be stopped. The exemplary steps may end in step 512.

In various exemplary aspects of the method and system for multi-stage device filtering in a Bluetooth low energy device, a BLE device such as the scanner 200 in the BLE communication system 100 may be operable to monitor transmissions over advertising channels. The scanner 200 may receive advertising packets transmitted from an advertising BLE device such as the advertiser 120. In various exemplary embodiments of the invention, the scanner 200 may be configured to filter the received advertising packets utilizing the hardware unit 212a of the BLE module 210 to search for the advertiser 120 prior to processing the received advertising packets. In instances where the advertiser 120 is not found by the device filtering in the hardware unit 212, the scanner 200 may continue filtering the received advertising packets utilizing the firmware unit 214 of the BLE module 210.

The scanner 200 may be operable to partition device identity information of a plurality of preferred BLE devices to form the hardware white list 212a, the firmware white list 214a, and the host white list 220a, for corresponding device filtering. The device identity information may comprise non-private device identity such as 48-bit Bluetooth low energy device addresses, and/or private device identity information such as Resolvable Private Addresses (RPAs) and/or Identity Root Key (IRK) for concurrent support of privacy and white listing during device filtering. Upon receiving the advertising packet from the advertiser 120, the scanner 200 may be operable to utilize the hardware unit 212 to start searching device identity information of the advertiser 120 in the hardware white list 212a. In instances where the advertiser 120 is found, by the hardware unit 212, in the hardware white list 212a, the hardware unit 212 may be configured to perform a CRC check on the received advertising packets.

The hardware unit 212 may be operable to send a response to the advertiser 120 if the CRC check passes. In instances where the advertiser 120 is not found, by the hardware unit 212, in the hardware white list 212a, the scanner 200 may be operable to continue the search utilizing the firmware unit 214. In instances where the device identity information of the advertiser 120 is found by the firmware unit 214, the scanner 200 may be operable to insert the device identity information of the advertiser in the hardware white list 212a for subsequent advertising packets from the advertiser 120. In instances where the advertiser 120 is not found by the firmware unit 214, the firmware unit 214 may be operable to awaken the host processor 220 of the BLE device to continue the device filtering in the host depending on the device configuration. For example, the firmware unit 214 may be operable to awaken the host processor 220 based on attribute type information related to the received advertising packets. In this regard, the host processor 220 may be operable to process the received advertising packets for a service even in instances when the advertiser 120 is not found by the hardware unit 212 and the firmware unit 214.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for multi-stage device filtering in a Bluetooth low energy device.

Accordingly, the present invention may be realized in hardware, software, or a combination of hardware and software.

The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

Therefore, the following is claimed:

1. A method, comprising:
accessing, by a receiving Bluetooth device, an advertisement packet transmitted from an advertising Bluetooth device, wherein the receiving Bluetooth device is configured to monitor transmissions over a plurality of advertising channels;
filtering, by the receiving Bluetooth device, the advertisement packet using hardware of the receiving Bluetooth device to determine whether the advertising Bluetooth device is known to the receiving Bluetooth device; and
if the advertising Bluetooth device is not known to the receiving Bluetooth device, filtering, by the Bluetooth device, the advertisement packet utilizing firmware of the receiving Bluetooth device to determine whether the advertising Bluetooth device is known to the receiving Bluetooth device.

2. The method of claim 1, further comprising partitioning, by the receiving Bluetooth device, device identity information for a plurality of preferred Bluetooth devices to form a list of permitted advertising Bluetooth devices for the hardware, the firmware, and a host of the receiving Bluetooth device.

3. The method of claim 2, wherein the device identity information comprises private device identity information, non-private device identity information, or a combination thereof, for the plurality of preferred Bluetooth devices.

4. The method of claim 2, wherein filtering, by the receiving Bluetooth device, the advertisement packet using hardware further comprises searching, utilizing the hardware of the receiving Bluetooth device, for device identity information of the advertising Bluetooth device in the list of permitted advertising Bluetooth devices for the hardware.

5. The method of claim 4, further comprising performing, utilizing the hardware of the receiving Bluetooth device, a cyclic redundancy check on the advertisement packet received based on the searching utilizing the hardware.

6. The method of claim 2, wherein filtering, by the receiving Bluetooth device, the advertisement packet using firmware further comprises searching, utilizing the firmware of the receiving Bluetooth device, for device identity information of the advertising Bluetooth device in the list of permitted advertising Bluetooth devices for the firmware.

7. The method of claim 6, further comprising adding the device identity information of the advertising Bluetooth device to the list of permitted advertising Bluetooth devices for the hardware, in response to the device identity information of the advertising Bluetooth device being found by the firmware.

8. The method of claim 7, further comprising awakening the host of the receiving Bluetooth device in response to the device identity information of the advertising Bluetooth device not being found by the firmware.

9. The method of claim 7, wherein the receiving Bluetooth device and the advertising Bluetooth device are Bluetooth low energy (BLE) devices.

10. A system for communication, the system comprising:
a receiving Bluetooth device in data communication with an advertising Bluetooth device, the receiving Bluetooth device configured to:
monitor transmissions over a plurality of advertising channels to receive an advertisement packet transmitted from the advertising Bluetooth device;
filter the advertisement packet using hardware of the receiving Bluetooth device to determine whether the advertising Bluetooth device is known to the receiving Bluetooth device; and
if the advertising Bluetooth device is not known to the receiving Bluetooth device, filter the advertisement packet utilizing firmware of the receiving Bluetooth device to determine whether the advertising Bluetooth device is known to the receiving Bluetooth device.

11. The system of claim 10, wherein the receiving Bluetooth device is further configured to partition device identity information for a plurality of preferred Bluetooth devices to form a list of permitted advertising Bluetooth devices for the hardware, the firmware, and a host of the receiving Bluetooth device.

12. The system of claim 11, wherein filtering the advertisement packet using hardware further comprises searching for device identity information of the advertising Bluetooth device in the list of permitted advertising Bluetooth devices for the hardware.

13. The system of claim 11, wherein filtering, by the receiving Bluetooth device, the advertisement packet using firmware further comprises searching, utilizing the firmware of the receiving Bluetooth device, for device identity information of the advertising Bluetooth device in the list of permitted advertising Bluetooth devices for the firmware.

14. The system of claim 13, wherein the receiving Bluetooth device is further configured to awaken a host of the receiving Bluetooth device in response to the device identity information of the advertising Bluetooth device not being found by the firmware.

15. The system of claim 11, wherein the receiving Bluetooth device is further configured to add the device identity information of the advertising Bluetooth device to the list of permitted advertising Bluetooth devices for the hardware, in response to the device identity information of the advertising Bluetooth device being found by the firmware.

16. The system of claim 10, wherein the receiving Bluetooth device and the advertising Bluetooth device are Bluetooth low energy (BLE) devices.

17. A system for communication, the system comprising:
a host comprising at least a processor and a receiving Bluetooth device in data communication with an advertising Bluetooth device, the host configured to:
access an advertisement packet received by the receiving Bluetooth device from the advertising Bluetooth device in response to an awakening of the host by the receiving Bluetooth device, the awakening initiated by the receiving Bluetooth device in response to a filtering of the advertisement packet using hardware and firmware of the receiving Bluetooth device determining that the advertising Bluetooth device is not known; and
filter the advertisement packet using the processor of the host to determine whether the advertising Bluetooth device is known to the receiving Bluetooth device.

18. A system of claim 17, wherein the host is further configured to transmit a response to the advertising Bluetooth device.

19. The system of claim 17, wherein the host is further configured to add device identity information of the advertising Bluetooth device to a list of permitted advertising Bluetooth devices for the hardware and the firmware, in response to the device identity information of the advertising Bluetooth device being found by the host.

20. The system of claim 17, wherein the receiving Bluetooth device and the advertising Bluetooth device are Bluetooth low energy (BLE) devices.

* * * * *